(12) United States Patent
Lecompere et al.

(10) Patent No.: US 12,358,211 B2
(45) Date of Patent: Jul. 15, 2025

(54) METHOD FOR THE PRODUCTION OF AN OPTICAL ELEMENT BY ADDITIVE MANUFACTURING

(71) Applicant: Essior International, Charenton-le-Pont (FR)

(72) Inventors: Maxime Lecompere, Charenton-le-Pont (FR); Pierre Leite, Charenton-le-Pont (FR); Manuel Theodet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 420 days.

(21) Appl. No.: 17/621,510

(22) PCT Filed: Jun. 23, 2020

(86) PCT No.: PCT/EP2020/067539
§ 371 (c)(1),
(2) Date: Dec. 21, 2021

(87) PCT Pub. No.: WO2020/260306
PCT Pub. Date: Dec. 30, 2020

(65) Prior Publication Data
US 2022/0347917 A1    Nov. 3, 2022

(30) Foreign Application Priority Data

Jun. 24, 2019 (EP) ..................... 19305829

(51) Int. Cl.
*B29C 64/129* (2017.01)
*B29C 64/188* (2017.01)
(Continued)

(52) U.S. Cl.
CPC .......... *B29C 64/129* (2017.08); *B29C 64/188* (2017.08); *B29C 64/264* (2017.08);
(Continued)

(58) Field of Classification Search
None
See application file for complete search history.

(56) References Cited

U.S. PATENT DOCUMENTS 4,575,330 A * 3/1986 Hull ..................... G03F 7/0037
430/269
5,089,184 A   2/1992 Hirano et al.
(Continued)

FOREIGN PATENT DOCUMENTS

CN   108170007   6/2018
CN   108274745   2/2021
(Continued)

OTHER PUBLICATIONS

Young, Gavin, and Adarsh Krishnamurthy. "GPU-accelerated generation and rendering of multi-level voxel representations of solid models." Computers & Graphics 75 (Jul. 19, 2018): 11-24. (Year: 2018).*

(Continued)

*Primary Examiner* — Benjamin A Schiffman
(74) *Attorney, Agent, or Firm* — Norton Rose Fulbright US LLP

(57) ABSTRACT

A method and a device for the production of an optical element (100) from a curable material by using an additive manufacturing technology. This method comprises a multiplicity of curing steps for curing said curable material inside outlines (C1) whose geometry are determined according to the geometry of said optical element, by applying a curing surface energy onto the curable material that is higher in a first area (A1) that extends sensibly along said sliced outline than in a second area (A2) situated within the first area, the curing surface energy applied to the second area being strictly lower than a first predetermined energy threshold.

18 Claims, 4 Drawing Sheets

(51) Int. Cl.
  *B29C 64/264* (2017.01)
  *B33Y 10/00* (2015.01)
  *B33Y 30/00* (2015.01)
  *B33Y 40/20* (2020.01)
  *B33Y 80/00* (2015.01)
  *B29L 11/00* (2006.01)

(52) U.S. Cl.
  CPC ............... *B33Y 10/00* (2014.12); *B33Y 30/00* (2014.12); *B33Y 40/20* (2020.01); *B33Y 80/00* (2014.12); *B29L 2011/0016* (2013.01)

(56) References Cited

U.S. PATENT DOCUMENTS

| | | | | |
|---|---|---|---|---|
| 5,104,592 | A * | 4/1992 | Hull | B44B 1/006 |
| | | | | 427/430.1 |
| 9,937,664 | B2 * | 4/2018 | Thiel | B29C 64/10 |
| 9,969,135 | B2 * | 5/2018 | Valeri | B29C 64/386 |
| 10,137,645 | B2 * | 11/2018 | Quere | B29C 64/106 |
| 10,363,710 | B2 * | 7/2019 | Rodriguez | B29C 64/264 |
| 10,442,146 | B2 * | 10/2019 | Gourraud | G02B 1/041 |
| 10,459,247 | B2 * | 10/2019 | Anatole | B29C 64/106 |
| 10,870,239 | B2 * | 12/2020 | Fenley | B33Y 30/00 |
| 11,511,483 | B2 * | 11/2022 | Theodet | B29C 64/106 |
| 11,548,215 | B2 * | 1/2023 | Soppera | B33Y 30/00 |
| 2005/0248062 | A1 | 11/2005 | Shkolnik et al. | |
| 2011/0196529 | A1 | 8/2011 | Shkolnik et al. | |
| 2011/0029048 | A1 | 10/2011 | Gullentops | |
| 2012/0219698 | A1 | 8/2012 | Steingart et al. | |
| 2015/0130114 | A1 | 5/2015 | Joyce | |
| 2016/0114530 | A1 | 4/2016 | Thiel et al. | |
| 2016/0114542 | A1 | 4/2016 | Quere et al. | |
| 2016/0221262 | A1 | 8/2016 | Das et al. | |
| 2016/0244628 | A1 | 8/2016 | Breton et al. | |
| 2017/0012679 | A1 | 4/2017 | Greene et al. | |
| 2017/0146822 | A1 | 5/2017 | Wildsmith et al. | |
| 2017/0210072 | A1 | 7/2017 | Rodriguez et al. | |
| 2018/0056604 | A1 | 3/2018 | Sands et al. | |
| 2018/0339397 | A1 | 11/2018 | Redfield | |
| 2018/0370149 | A1 * | 12/2018 | Ishibe | B29C 64/277 |
| 2021/0387431 | A1 * | 12/2021 | Baudart | G02C 7/022 |
| 2022/0118705 | A1 * | 4/2022 | Lecompere | B29D 11/00009 |
| 2022/0347917 | A1 | 11/2022 | Lecompere et al. | |
| 2022/0350304 | A1 * | 11/2022 | Lecompere | B33Y 50/02 |
| 2023/0041524 | A1 * | 2/2023 | Lecompere | B29D 11/00009 |
| 2024/0042683 | A1 * | 2/2024 | Lecompere | B33Y 80/00 |

FOREIGN PATENT DOCUMENTS

| | | |
|---|---|---|
| GB | 2477828 | 8/2011 |
| JP | H05-154924 | 6/1993 |
| JP | 2004-025843 | 1/2004 |
| JP | 2007-536131 | 12/2007 |
| JP | 2016-530127 | 9/2016 |
| JP | 2017-159557 | 9/2017 |
| WO | WO2017/055747 | 4/2017 |
| WO | WO2017/127334 | 7/2017 |
| WO | WO2019/002905 | 1/2019 |
| WO | WO2020/169837 | 8/2020 |
| WO | WO2020/260305 | 12/2020 |

OTHER PUBLICATIONS

International Search Report & Written Opinion issued in priority application PCT/EP2020/067539, dated Sep. 1, 2020.
International Search Report & Written Opinion issued in related application PCT/EP2020/054696, dated Jul. 3, 2020.
International Search Report & Written Opinion issued in related application PCT/EP2020/067538, dated Sep. 2, 2020.
Rank et al., "3D Printing of Optics", ISBN: 9781510619982, 2018.
Vitale et al., "Frontal Conversion and Uniformity in 3D Printing by Photopolymerisation", Materials, 2016, (9)760, pp. 1-13.
Xu et al., "Mask Image Planning for Deformation Control in Projection-Based Stereolithography Process", Journal of Manufacturing Science and Engineering, vol. 137, Jun. 2015, 12 pages.
Bennett, et al. "Measuring UV curing parameters of commercial photopolymers used in additive manufacturing", *Additive Manufacturing*, vol. 18, pp. 203-212, 2017.
Office Action issued in corresponding U.S. Appl. No. 17/621,514 issued Apr. 12, 2022.

* cited by examiner

METHOD FOR THE PRODUCTION OF AN OPTICAL ELEMENT BY ADDITIVE MANUFACTURING

BACKGROUND OF THE INVENTION

The invention relates to the manufacturing of optical components, for example ophthalmic lenses.

More precisely the invention relates to a process for manufacturing an optical element from a curable material using an additive manufacturing technology.

The invention also describes a manufacturing system for manufacturing an optical element from a curable material using an additive manufacturing technology.

The additive manufacturing technologies are suitable for manufacturing many devices, particularly for manufacturing prototype devices within the framework of the development of new technologies as the final obtained device is directly formed with the required shape. However, in the current stage of development, the additive manufacturing technologies are rarely adapted to be used as an industrial tool for mass production of ophthalmic devices.

The additive manufacturing technologies are usually based on a building process layer-by-layer or drop-by-drop. The intended device is thus formed by the overlapping of layers, pseudo layers, or drops.

Regarding the manufacturing of ophthalmic lenses, especially for eyeglasses, the additive manufacturing technologies are used to produce models of ophthalmic lenses. However, these models are rarely adapted to be used in a frame in order to be worn by a wearer. Indeed, an accumulation, within the manufactured optical device, of the interfaces between the layers (or drops and/or the traces of pixels present within the irradiating tools) often forms slight optical defects, and in particular diffracting defects.

These defects appear at the interface between the layers, because the material located on either side of this interface has hardened at different times, which generates local differences in optical properties of the material, leading to diffraction between the layers (it has been noted that the formation of an optical device with a stacking of a multiplicity of layers induces a repetition of a pattern, and such repetitive alternation of optical properties induces the formation of diffracting defects). Moreover, the hardening of the material in a single layer also occurs not uniformly but rather point by point, which also generates diffraction between these points.

These defects are critical when the ophthalmic lens is finally used.

BRIEF SUMMARY OF THE INVENTION

To reduce these defects, a solution devised by the inventors for forming an optical element is to cure the material in multiple steps, such that each layer of material is not fully cured when an overlapping layer of material is formed onto it, so as to let it reorganize itself during hardening in such a manner that the layers mix with each other.

This solution has a major drawback. This solution indeed implies that before being hard, the layers have to not be fully cured before depositing an overlapping layer and they can even be in an intermediate state, which is neither solid nor liquid but between these two phases (this phase is called "gel state" as explained hereinafter). Accordingly the layers which are in this intermediate state can easily be damaged by mechanical stresses due to their lack of mechanical strength. Such damages may specifically appear when the layers are moved relatively to the surrounding material or to structural elements present near the layers, for example when further layers are introduced or when the material moves. In other words, there is a risk of affecting the geometry of the outline of a layer during the manufacturing of the layers situated onto this layer, with a risk of affecting the geometry of the outline of the manufactured device.

Therefore one object of the invention is to provide an optic element that does not has defects between layers and that presents the exact desired geometry.

The above objects are achieved according to the invention by providing a method comprising a multiplicity of curing steps for curing said curable material inside outlines, the geometry of which are determined according to the geometry of said optical element, by applying a curing surface energy onto the curable material that is higher in a first area that extends along said outline than in a second area situated within the first area, the curing surface energy applied to the second area being strictly lower than a first predetermined energy threshold.

In other words, a difference between the skin and the core of the optic element is created: according to the invention, the optic element is manufactured by curing faster the skin of this element than in a core part of this element. The skin thus acts as a levee for the material of the core and is anchored with the skin part of previously formed or irradiated layers, such as layers of the underlying material, so as to ensure stability and shape preservation of the layer of material. This principle applies perfectly to stereolithography technologies but this principle may also apply to polymer jetting, the droplets being always arranged or deposited in pseudo-layers.

This feature ensures the optic element to present the exact desired geometry even if this element is mechanically stressed during its manufacturing.

The faster curing of the material along the skin of the element may lead to produce some of optical defects mentioned above but, because the width of this skin is thin relative to the dimensions of the end product, the defects generated are of little magnitude and do not generate major optical problem for the end product.

Other combinable features of the invention are:

the process comprises a further final step enabling a complete curing of both the curable material in the first area and the curable material in the second area;

the total curing surface energy received by a major part of the second area just before said final step is higher or equal to said first predetermined energy threshold;

the curing surface energy applied to the first area is higher or equal to a second predetermined energy threshold, said second predetermined energy threshold being equal to or greater than said first predetermined energy threshold;

said step is repeated layer by layer with each outline to manufacture said optical element;

said first predetermined energy threshold is strictly lower than a critical Jacobs energy defined for the curable material;

said second predetermined energy threshold is equal to or greater than said critical Jacobs energy ($E_C$);

said second predetermined energy threshold is equal to or greater than a Jacobs energy determined for the first area of a given layer by using the Jacobs' equation defined as {EJ=EC*exp (th/DP)} with Ej a the Jacobs energy from which said second predetermined energy threshold derives, th the thickness of the layer, Dp a light depth penetration value of the curing energy within the curable material, and Ec a the critical Jacobs energy;

said second predetermined energy threshold is determined for the first area of a given layer by using the Jacobs' equation;

the critical Jacobs energy $E_C$ is determined using the empirical method based on the Jacobs' equation (Paul F. Jacobs, *Fundamentals of stereolithography in International Solid Freeform Fabrication Symposium*, 1992);

said curable material being able to be polymerized, said second predetermined energy threshold is determined such that the polymerization in the first area is greater than 95% after said step;

the curing surface energy is directly applied onto a third area situated outside the first area with an intensity that is different from the intensity of the curing surface energy applied onto said first area, said intensity being preferably smaller than the intensity of the curing surface energy applied onto said first area;

a curing surface energy is directly applied onto a fourth area situated inside the first area with an intensity that is smaller than the intensity of the curing surface energy applied onto said first area and that is different from the intensity of the curing surface energy applied onto said second area;

a curing surface energy is directly applied onto a fifth area situated inside the first area with an intensity that is higher than or equal to the intensity of the curing surface energy applied onto said first area;

it is to be noted that said comparisons of intensities are defined with regard to the intensity of curing surface energy received directly when irradiating the considered layer (in other words, said layer is situated at the top of the superimposition of layers so that the energy is not received through other layers)

said step is repeated layer by layer to manufacture said optical element;

for at least one layer, the curing energy is applied in one substep such that the curing energy is applied on a part of the surface of the curable material with a non-null intensity that differs from an area to another;

for at least one layer, the curing energy is applied in several substeps on the surface of the curable material, during one of said substeps, the intensity of the curing surface energy applied to the first area is non-null and the intensity of the curing surface energy applied to the second area is null, and during another of said substeps, the intensity of the curing surface energy applied to the first area is non-null and equal to the intensity of the curing surface energy applied to the second area; in that case, several substeps of application of the curing energy are done without substantially adding material on top of said at least one layer between each substeps;

during each substep, the curing surface energy is shaped in a discrete manner so that each area is composed of several irradiated discrete units, said curing surface energy being either null or applied sensibly without intensity variation from a discrete unit to another; in that case, the presence of shadowed area within the discrete units are not counted as an intensity variation from one discrete unit to another;

the curing surface energy is applied by a curing unit suitable to generate a pixelated pattern on the surface of the curable material that creates voxels in the curable material and wherein said first area is formed of a first set of voxels that extends along a closed path that has a width which depends on the geometry of the optical element and/or on the shape of each voxel and/or on the light depth penetration value;

the curing surface energy is applied by a curing unit suitable to generate a pixelated pattern on the surface of the curable material that creates voxels in the curable material and wherein said first area is formed of a first set of voxels that extends along a closed path that has a width of more than 3 voxels and preferably less than 10 voxels, more preferably less than 5 voxels;

the first set of voxels is determined as a function of the determined geometry of said outline and as a function of any one of the following parameters: the type of post-processing process, said post-processing process being of the subtractive type or of the additive type, the geometry of the voxels, and the reference of the machine used to manufacture the optical volume element;

the position of the first set of voxels relative to the surface of curable material is defined as a function of the geometry of said outline and as a function of the geometry of the voxels;

the position of the first set of voxels is defined so as to minimize the root mean square of a function of a surface error between a projection of the outline of the first set of voxels and a projection of said outline in a same plane, said function being defined to take into account the type of post-processing process;

said step is repeated layer by layer to manufacture said optical element, each voxel having a thickness that is equal to the thickness of the considered layer, and wherein the position of the first set of voxels is defined so as to minimize the root mean square of the volume error between said outline and an external outline of the first set of voxels;

said optical element being designed to be post-processed thanks to a finishing process of the subtractive type, the external outline of said first area is situated outside and/or on said outline;

said optical element being designed to be post-processed thanks to a finishing process of the additive type, the external outline of said first area is situated inside and/or on said outline;

said optical element is an ophthalmic lens;

the first predetermined energy threshold is lower than or equal to a solid predetermined energy threshold corresponding to an energy sufficient to make the first part of the optical element solid on the whole thickness of said first part of the optical element;

the second predetermined energy threshold is equal to an induction surface energy;

the process comprises:

a) a first step of forming a first part of the optical element by irradiating the surface of the curable material with a first curing surface energy, the first curing surface energy being strictly lower than the first predetermined energy threshold and higher than the second predetermined threshold, and b) a second step of forming, after the irradiation of the first part with the first curing surface energy, at least a second part of the optical element, distinct from the first part of the optical element, by irradiating, with at least a second curing surface energy, said second curing surface energy being higher than the second predetermined energy threshold, the second curing surface energy irradiating both the second part of the optical element and at least a portion of the first part of the optical element, the sum of the first curing surface energy and the portions of the at least second curing surface energy received by said first part of the optical element being sufficient to make the first part of the optical element solid, the sum of the first curing surface energy and the portions of the at least second curing surface energy received by said first part of the optical element being preferably higher than or equal to the first solid predetermined energy threshold.

The invention also deals with a manufacturing system for manufacturing an optical element from a curable material using an additive manufacturing technology comprising:
a container suitable for containing a curable material,
a support suitable for supporting the optical element to be formed,
a forming unit suitable for curing said curable material at least inside a outline whose geometry is determined according to the geometry of said optical element, and
computer element programmed to control said forming unit so as to apply a curing surface energy onto the curable material that is higher in a first area that extends along said outline than in a second area situated within the first area, the curing surface energy applied to the second area being strictly lower than a first predetermined energy threshold.

BRIEF DESCRIPTION OF THE DRAWINGS

The following description with reference to the accompanying drawings, given by way of non-limiting example makes it clear what the invention consists in and how it can be reduced to practice.

In the accompanying drawings.

DETAILED DESCRIPTION OF THE INVENTION

Figure 1:
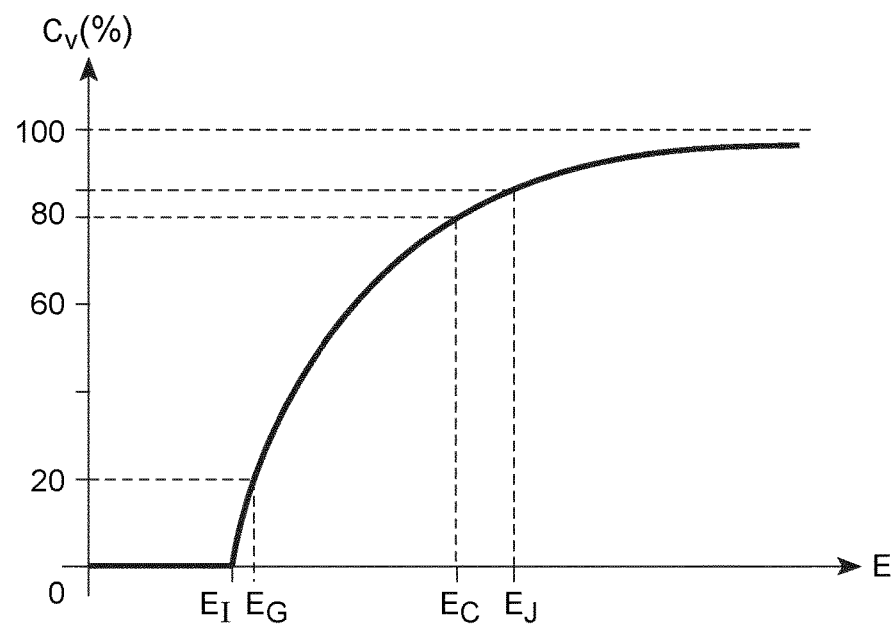
FIG. 1 represents a curve showing the conversion rate of a curable material as a function of the curing surface energy applied onto the surface of this material.

The present invention relates in general to a process adapted to manufacture an optical element using an additive manufacturing technology.

The invention applies more particularly to the manufacturing of all kinds of optical devices and elements, such as ophthalmic elements and devices. Non-limiting examples of ophthalmic elements include corrective and non-corrective lenses, including single vision or multi-vision lenses, which may be either segmented or non-segmented, such as multifocal lenses or progressive lenses, as well as other elements used to correct, protect, or enhance vision, and protective lenses or visors such as found in spectacles, glasses, goggles and helmets. The optical article of the present invention is preferably a lens, and more preferably an ophthalmic lens an ophthalmic lens, for example suitable for being mounted in an eyeglass frame.

The expression "additive manufacturing technology" refers to a manufacturing technology as defined in the International standard ASTM 2792-12, which mentions a process of joining materials to make objects from 3D model data, usually layer upon layer, as opposed to subtractive manufacturing methodologies, such as traditional machining. Solid objects are thus manufactured by juxtaposing volume elements (mainly layers or voxels or drops or droplets, or, in some case even blocks of matter). In the case of the present invention, the optical element will be described as being manufactured layer by layer but the invention is not narrowed to such an embodiment.

The additive manufacturing technology may be in practice stereolithography (SLA), digital light processing stereolithography (DLP-SLA), LED or L-COS stereolithography, or polymer jetting. Additive manufacturing technologies comprise processes which create objects by juxtaposition of volume elements according to a pre-determined arrangement that can be defined in a CAD (Computer Aided Design) file.

Stereolithography (SLA) and digital light processing stereolithography (DLP-SLA) both work by focusing an ultraviolet light onto a vat of photopolymer liquid resin in order to form solid layers that stack up to create a solid object. Regarding stereolithography (SLA), the liquid resin receives a selective exposure to light by a laser beam scanning the print area. Digital light processing stereolithography (DLP-SLA) uses a digital projector screen to project an image of each layer across the entire surface of the resin. As the projector is a digital screen, the image of each layer is composed of square pixels, resulting in a layer formed from small rectangular bricks called voxels (volume defined by the square pixel and the thickness of the layer).

As an alternative, the pixels may have other shapes, such as being hexagonal, rhombus or elongated depending on using micro-mirrors or digital screens or other devices to modulate and generate the image of each layer, and on the properties of such device such as micro-mirrors shape, the use of LCD technology or the LED technology for the digital screen . . . etc.

A polymer jetting technology uses and inkjet print head to jet droplets of liquid photopolymer resin onto a build platform. The liquid resin is immediately cured by an ultraviolet lamp and solidified in order to build layers, or the final element, set of droplets by set of droplets (and form the solid object).

In the described embodiment, the digital light processing stereolithography will be preferred, but the invention is not narrowed to such an embodiment.

In practice here, the additive manufacturing technology used is based on the projection of an ultraviolet light pattern on a curable material. The light pattern is for example an infrared pattern or an ultraviolet pattern. The curable material is for example a photopolymer resin and the optical element is manufactured by a photopolymerization process. As an example, the photopolymer resin comprises (meth) acrylate monomers.

In practice, the photopolymerization process can be characterized by a conversion rate $C_v$ (or polymerization rate) of the curable material. The conversion rate $C_v$ is linked to the physical state of matter of the curable material. Before being irradiated by the curable energy, mostly irradiation by light, the curable material is liquid. The conversion rate $C_v$ is considered close to 0, not withstanding a slight polymerization due to ageing of the curable material. Under the irradiation of the curable material by the curable surface energy, the curable material polymerizes and switches progressively from a liquid state to a solid state. The curable material is going through multiple states, especially an intermediate state, called "gel state", which corresponding conversion rate $C_v$ depends of the curable material. The intermediate state corresponds to a matter state which is neither liquid nor solid but between them, in particular, not solid enough according to the method according to the methodology of Jacobs, but with monomer having started to polymerize with each other, starting to form parts of a polymer network. The conversion rate $C_v$ of the intermediate state may for example be between 20% and 80% for some acrylate monomers, or higher than 10% and/or lower than 67% for some others. The curable material is considered to be in a solid state for a conversion rate $C_v$ generally higher than 80%. For some acrylate monomers, the curable material is considered to be in a solid state for a conversion rate $C_v$ higher than 67%. Depending on the material, the curable material is considered to be in a solid state for conversion rates higher than a critical conversion rate which may be empirically determined between about 60% to about 80%.

The conversion rates characterizing the intermediate state and the solid state depend on a curing surface energy E (or light dose) derived from the light source, on the absorption properties of the curable material, and on the efficiency of initiator to polymerize the curable material. FIG. 1 represents the conversion rate $C_v$ (in %) as a function of the curing surface energy E which irradiates the curable material in the case of acrylate monomers.

As visible in this Figure, in some cases, especially for radical chain growth polymerization, as long as the curing surface energy is lower than an induction surface energy $E_I$, the conversion rate remains close to 0. During this period (called the "induction period"), the curable material remains liquid and the polymerization does not occur.

In the case of a radical chain growth polymerization, the reaction between the primary radicals formed by activation of initiators and the monomers is quenched by an inhibitor, here the dioxygen, that reacts preferentially with said radicals thus preventing reacting with monomers. During the induction period, the curing surface energy E received by the curable material is thus used to consume the inhibitor, here dioxygen. When the curing surface energy E received by the curable material reaches the induction surface energy $E_I$, the polymerization process occurs.

When the curing surface energy received by the curable material reaches the induction surface energy $E_I$, the polymerization process is initiated.

It is to be noted that some polymerization processes do not have an induction period, such as some cationic-chain growth polymerization. In such cases, the invention still applies, with the induction surface energy which is negligible.

As long as the total received curing surface energy remains lower than an intermediate surface energy $E_G$, the curable material remains in a liquid state but the polymerization process is occurring and the conversion rate $C_v$ increases (particularly with the beginning of the formation of polymer networks). In the example represented in FIG. 1, as the curable material is still in a liquid state, the conversion rate $C_v$ remains lower than 20% for acrylate monomers.

When the curing surface energy received by the curable material reaches the intermediate surface energy $E_G$, the curable material is considered as being in a intermediate state. In other words, it means that the curable material is between a hard and a liquid state. According to the Compendium of Chemical Terminology (also called the "IUPAC Gold Book" or more simply "Gold Book" by chemists), the intermediate surface energy $E_G$ is defined as the energy of incipient network formation in a polymerization process forming the polymer network.

As long as the total received curing surface energy remains lower than a critical Jacobs energy $E_C$, the curable material remains in the intermediate state, but the polymerization process is progressing and the conversion rate $C_v$ increases (with the conversion of monomers). The critical Jacobs energy $E_C$ is defined as the surface energy to provide to a given thickness of a curable material in order to form a measurable solid part of material. In other words, the critical Jacobs energy $E_C$ corresponds to the minimum surface energy to provide to polymerize the expected thickness with a minimum conversion rate empirically determined, for a given curable material, to be enough that the element is solid enough to be measured. Here, in the case of acrylate monomers, the corresponding conversion rate $C_v$ is around 60% to 80%. According to this range for the conversion rate, it is to be noted that there is no need to reach a total monomers conversion to get a solid polymerized material.

The critical Jacobs energy $E_C$ is determined using an empirical method based on the Jacobs' equation (Paul F. Jacobs, *Fundamentals of stereolithography in International Solid Freeform Fabrication Symposium*, 1992)

$$th = D_P . \exp\left(\frac{E}{E_C}\right),$$

with E the curing surface energy, $E_C$ the critical Jacobs energy, $D_P$ a light depth penetration value of the curing surface energy within the curable material and th the polymerized thickness considered along the path of the light rays carrying the energy. The light depth penetration value $D_P$ corresponds to the distance which is crossed by the ultraviolet light along said path before being fully absorbed. The critical Jacobs energy depends on the curable material.

The curing surface energy E is an average energy per surface unit (for instance per m²).

The Jacobs' experiment is set to determine the critical Jacobs energy. The Jacobs' experiment consists in irradiating a curable material (here a resin) with a set of known curing surface energies and measuring the corresponding polymerized thickness of measurably solid material. The Jacobs' experiment is adapted to determine the critical Jacobs energy $E_C$ and the light depth penetration value $D_P$ using these measurements of polymerized thicknesses (knowing the curing surface energy received by the curable material).

Figure 2:
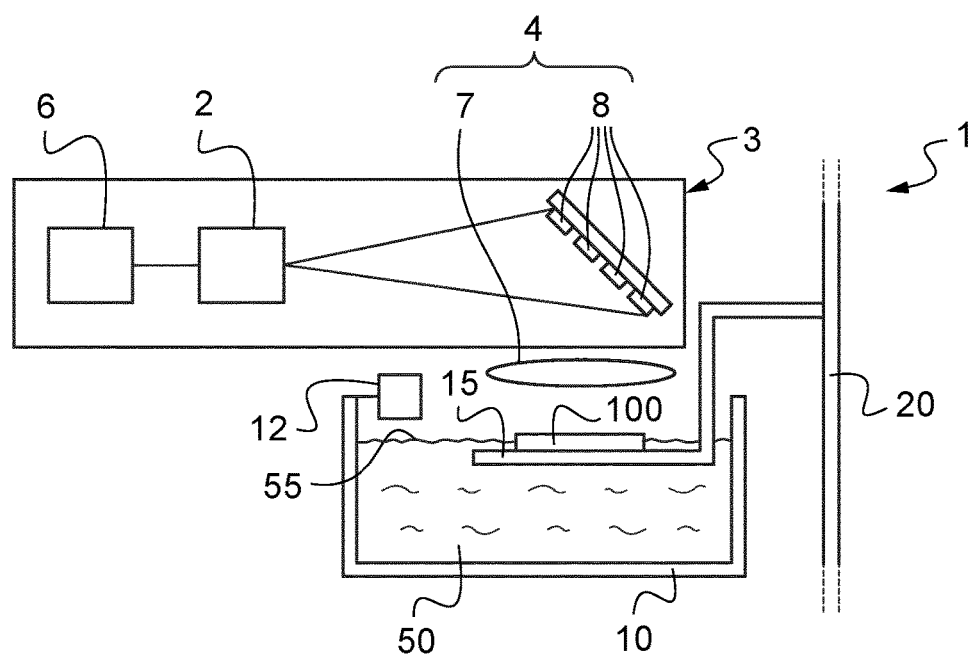
FIG. 2 represents an exemplary manufacturing system adapted to manufacture an optical element according to the invention.

FIG. 2 shows a manufacturing system 1 adapted to manufacture an optical element by way of a DLP-SLA process. The manufacturing system comprises a forming unit 3, a container 10, a support 15 and a shifting device 20 (here an actuator).

The forming unit 3 comprises an energy source 2, an optical system 4, and a computer element 6. The forming unit 3 is adapted to implement a method for manufacturing an optical element 100 as described below when the instructions are executed.

In practice, the computer element 6 includes a microprocessor and a memory (not represented). The microprocessor is adapted to execute the instructions to manufacture the optical element 100 and the memory stores these instructions. As an example, the computer element 6 is programmed to generate instructions regarding the magnitude of the curing surface energy E for each successive step of providing a curing surface energy, and regarding image patterns, or light patterns, to be projected on the surface 55 of the curable material 50. These instructions are for example transmitted to the energy source 2 and/or to the optical system 4.

The energy source 2 is suitable for irradiating the surface 55 of the curable material 50 with a curing surface energy E. The energy source 2 provides a light beam, for example, an ultraviolet light beam, directed to the curable material 50 by the optical system 4.

The optical system 4 is adapted to project the light coming from the energy source 2 onto the surface 55 of the curable material 50 to form said image pattern. The imager 4 comprises a plurality of micro-mirrors 8 arranged into a grid format.

It is to be noted that other alternative combination of energy source and imager exist. For example, the formation of the image pattern may be generated entirely by the energy source, using micro-mirrors or a digital screen, using LCD or LED pixels for example, and the imager only provides positioning and focusing effects; alternatively, the energy source may provide energy in a continuous or regular burst manner, and the imager generates the image pattern on top of positioning and focusing effect.

In practice, the micro-mirrors 8 are separated from each other by an interspace (indeed, it is not possible to have a perfect junction between two adjacent micro-mirrors); digital screens using LCD or LED pixels also bear such interspaces.

A micro-mirror 8 is for example in a sensibly square-shape, with a size of for example 8×8 µm². The interspace is comprised between 1 and 10 µm, for example around 2.8 µm, for a pitch between micro-mirrors of about 10.8 µm. Once projected onto the surface 55 of the curable material 50, the micro-mirrors may form projected pixels with a given pitch, comprising a direct projection of the micro-mirrors and of the interspace, for example the pitch may be of about 40×40 µm, with about 30×30 µm corresponding to a projection of the micro-mirrors, separated by an interspace of about 10 µm.

When the micro-mirrors 8 are illuminated by the light beam, they either reflect the light toward the surface 55 of the curable material 50 with a light intensity or do not reflect the light toward said surface 55 depending on an individual control of each micro-mirror. Consequently, the micro-mirrors 8 are adapted to draw a pattern on the surface 55 of the curable material 50, which pattern is pixelated (each pixel corresponds to a micro-mirror). Because the micro-mirrors 8 are separated from each other by an interspace, the projected pattern on the surface of the curable material 50 thus comprises some shadowed areas. Thus, the pixels on this projected pattern are separated from each other by an interpixel space. The material situated under these interpixel spaces is less polymerized than the other part of the material. In some cases it can even be under-polymerized or not polymerized.

The repetition of such regular variation of the polymerisation rate within a same layer, due to the presence of the underpolymerized shadowed areas, and the succession of layers leads to the formation of observable diffraction defects. Such defects are incompatible with the expected optical quality of spectacle lenses.

Indeed, the inventors have noted that even in cases where the curable surface energy is very high, and that the shadowed area receive enough surface energy to become solid in the meaning of Jacobs during the irradiation of single projection of an image pattern, but less than in the other areas, or receive such energy in a post-curing step, the polymerisation rate, and/or pace, of the shadowed area is different than in the area corresponding to the projection of the micro-mirrors, leading to the formation of observable diffracting defects.

In this specification, we will consider that the projected pattern is composed of square pixels, resulting in a layer formed from small rectangular bricks called voxels (volume defined by the square pixel and the thickness of the layer).

As visible in FIG. 2, the optical system 4 comprises here a projection system 7 adapted to direct the ultraviolet beam from the plurality of micro-mirrors 8 to the surface 55 of the curable material 50. Further, the size of the micro-mirrors or LCD or LED pixels or of the projected pixels may vary from the current example without disparaging from the invention.

The curable material 50 is stored in the container 10 in a liquid state. Once polymerized, the curable material 50 forms the optical element 100 which is born by the support 15. In practice, the support 15 is partly immersed in a vat of curable material 50 such that a portion of the liquid curable material 50 is on the top of the support 15. The light beam provided by the energy source 2 is thus projected on this portion of the curable material 50. When this portion is polymerized, the part of the optical element which is formed is thus on the support 15.

It is to be noted that the support may comprise support beams formed by cured curable material.

The manufacturing system 1 also comprises the shifting device 20. The shifting device 20 is suitable for shifting the support 15 on which the optical element 100 is formed with regard to the vat of curable material. This shifting device 20 allows a vertical movement of the support 15, relative to the vat of curable material, along an axis sensibly orthogonal to the surface 55 of the curable material 20. This vertical movement of the support 15 allows controlling the thickness of liquid curable material 50 to polymerize. The shifting device 20 thus allows controlling the thickness of the polymerized layer.

The shifting device 20 also allows, in the current example, a horizontal movement, along an axis sensibly parallel to the surface 55 of the curable material 50.

As represented in FIG. 2, the manufacturing system 1 comprises here a recoater device 12. This recoater device 12 is for example suitable for spreading some curable material on the top of a previous layer of curable material. Alternative method do not use a recoater and may position a membrane on the surface of curable material to achieve flatness of the material and controlling the thickness of curable material added on top of an previous layer of curable material.

As explained hereunder, the manufacturing system 1 is programmed to product an optical element 100 from a curable material 50 by using an additive manufacturing process.

This optical element 100 advantageously comprises an ophthalmic lens. It may comprise only this ophthalmic lens. In a variant, it may comprise both an ophthalmic lens and a stabilizer that immobilize the lens on the support 15.

The process comprises a first step of acquiring the 3D geometry of the optical element 100.

Then, this 3D geometry is divided into volume units. Because the considered manufacturing system 1 is a DLP-SLA device, this 3D geometry is sliced into several layers of the same thickness.

Figure 3A:
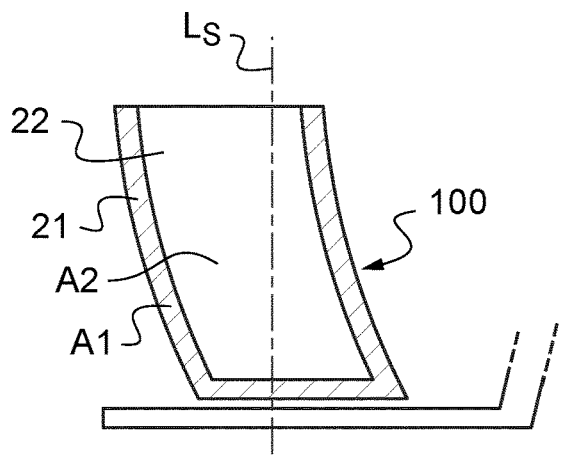
FIG. 3A represents a side view of a part of an optical element to be manufactured according to the invention.
Figure 3B:
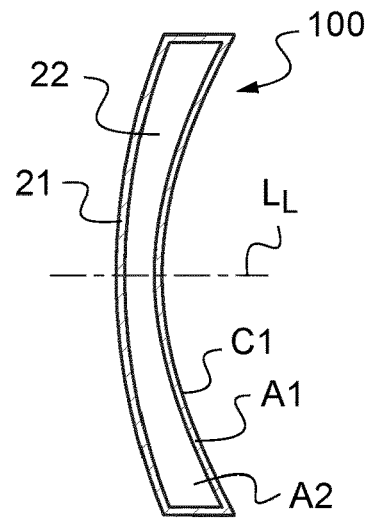
FIG. 3B represents a top view of the part of the optical element represented in FIG. 3A.

As shown in FIGS. 3A and 3B, here, the layers are superimposed along an axis $L_S$ roughly orthogonal to an optical axis $L_L$ of this ophthalmic lens (this optical axis $L_L$ being for instance, in the case of a monofocal lens, an axis along which the light is not deviated when it passes through the lens). This example illustrates also by inference the case where the axis $L_S$ of superimposition is tilted from more than 45 degrees relative to this optical axis $L_L$.

It is to be noted that the invention also apply when the axis $L_S$ of superimposition is tilted from less than 45 degrees relative to this optical axis $L_L$.

The intersection between the mean plane of each layer and the external 3D contour of the optical element 100 defines an outline called hereinafter "sliced outline C1". This sliced outline C1 thus extends in a 2 dimensional plane. It is to be noted that the sliced outline C1 corresponds to an outline of the solid part of the device to be manufactured, for example the optical element 100.

It is to be noted that in most embodiments the slicing mentioned with regard to the sliced outlines corresponds to the slicing into the layers for the manufacturing step.

Then, the process comprises a multiplicity of curing steps for curing (ie hardening) the curable material 50 layer by layer, inside each sliced outlines C1, by applying a curing surface energy E onto the surface 55 of the curable material 50.

To this end, each layer is irradiated one after the other, the support being submerged between two irradiations of a depth equal to the layer thickness of a next layer and the recoater device 12 spreading some curable material 50 on the top of the last formed layer.

According to the invention, for at least one layer (and in practice for most of the layers), the curing surface energy E applied on the surface 55 of the curable material 50 has an intensity that is higher in a first area A1 that extends along said sliced outline C1 than in a second area A2 situated within the first area A1, so as to be sensibly enclosed by said first area. It is to be noted that in the case where the solid envelop of the final device comprise an internal cavity, or that the slicing of the device shape forms an apparent cavity for a layer, the sliced outline may comprise one or more external outline and one or more internal outline. Accordingly, the first area may extend sensibly along the external outlines and along the possible internal outlines. Further, the second area would be present so as to be enclosed by the first area, between an external outline and a corresponding internal outline.

This energy repartition is preferentially used to cure most of the layers of the optical element 100. In practice, it may be used to cure the entire optical element 100, excluding the bottom and the top of this element (see FIG. 3A), where a skin part might be needed on the whole part of the layer within the sliced outline C1 (for one or more layers).

The curing surface energy E applied to the second area A2 is strictly lower than a first predetermined energy threshold T1 (here the Jacobs energy $E_J$ or preferably the critical Jacobs energy $E_C$).

In other words, the second area A2 of each of these layers is only partially cured and not hardened before being covered by a new layer of curable material 50. More precisely, before being covered by a new layer, the previous layer is cured so that it has a skin 21 (the first area A1) in a solid state and a core 22 (the second area A2) in an intermediate or liquid state (preferably in an intermediate state). By intermediate state it is meant within the specification a state where polymerization has initiated, a first part of a polymer network is formed but the material is not solid enough to be measured according to the Jacobs' methodology.

Alternatively before being covered by a new layer, the previous layer is cured so that it has a core 22 (the second area A2) in an intermediate or liquid state (preferably in an intermediate state) and a skin 21 (the first area A1) in also an intermediate state with a conversion rate higher than the one of the core 22, for example approaching a conversion rate corresponding to having received the Jacobs energy $E_J$, or at least the critical Jacobs energy $E_C$.

Thanks to the invention, when more curable material 50 is added on the last formed layer while the core 22 is still in a intermediate state and susceptible to external stress, here with a recoater device 12, the skin 21 is polymerized enough to maintain its shape, so that the skin 21 can maintain the shape of the core 22.

As it will be explained in more details hereafter, some of the layers of the optical element 100 may comprise more than two different areas A1, A2, polymerized differently to ensure different functions.

Before explaining how the skin 21 and these other areas are cured, we can give an example of polymerization of the core 22, to understand why the core of a layer is still in an intermediate state when a new layer of curable material is delivered onto this layer.

To this end, we can take into consideration a layer that is situated at a distance from the bottom and the top of the optical element.

The intensity I2 of the curing surface energy E used to polymerize the core 22 of this considered layer is strictly lower than the critical Jacobs energy $E_C$ but is higher than another predetermined energy threshold T2 (here the induction surface energy $E_I$).

The set of pixels projected on the surface 55 of the curable material 50 to form this core 22 are separated from each other by an interpixel space. Consequently, the core 22 comprises an alternating of intermediate state zones (that were directly irradiated and for which the polymerization is occurring) and of underpolymerized zones (that are still in a liquid state, or less polymerized than in the zone directly irradiated).

According to the invention, all these zones will be further polymerized later, during another irradiation of the considered layer or preferably during the irradiation of one or several other layers placed on the considered layer. These irradiations are preferentially performed in such a manner that the polymerization of all these zones will not be very different.

In this described embodiment, we will consider that a single irradiation is directly applied on each layer, even though the invention applies even if multiple irradiations are directly applied to each layer (or at least some layers).

Each curing surface energy E applied to the surface of the curable material 50 is determined as a function of the depth penetration value $D_P$ of the curable energy within the curable material, thus taking into account the light absorption of the curable material. In other words, each surface energy needs to be sufficient to go through several layers in order to polymerize the material of the layers situated under the last formed layer.

In order to compensate the shadowed zones, before irradiating the liquid curable material 50 of a new layer with a new pixelated pattern, the manufacturing system 1 is adjusted in such a way that the pixels of this pattern cover the shadowed areas of the last formed layer. In practice, to this end, the support 15 is shifted along an axis sensibly parallel to the surface of the curable material. According to an alternative easier to operate, the optical system 4 is controlled so as to shift the projection of the pattern onto the vat of material, for example by a value smaller than a pixel's dimension.

In this example, due to the transmission of the curing surface energy E through the different layers, the considered layer is then fully polymerized because the sum of the curing surface energies it receives directly and indirectly (through other layers) is higher than or equal to the critical Jacobs energy $E_C$.

It is to be noted, that the invention may also apply with some parts of the second area (or a fourth area if any) still being in intermediate state or having received barely enough energy to reach the Jacobs energy. In those cases, after the additive manufacturing process, the hard skin and/or further solid parts of the device (such as fifth areas or part of the second area) enables to maintain the geometry and potentially manipulate the device. Thereafter, the device undergoes a final curing step to finalize the hardening of all the parts of the device. As explained hereafter, the final curing step may for example be an UV-oven-curing step, and/or a thermal curing step if the material is adapted to such curing process.

The advantage of building the core area(s) according to this method is that the curable material in the core 22 of the optical element 100 has enough time to reorganize itself in such a manner that its layers mix with each other (which reduces the defects) thanks to the light dose distribution control. This characterization thus increases the optical quality of the lens.

In more details, within the parts corresponding to the core area(s), the curable material of the superimposed layers can organize itself in such a manner that the material of the layers interpenetrates with each other (which reduces the defects) thanks to a collapsing process between layers which occurs while being in the intermediate state of matter. For that, light dose distribution needs to be highly controlled. In particular, the lower the variation of matter state between adjacent voxel, the better defects reduce.

Using this embodiment of the invention for the core area thus increases the optical quality with regard to the optical defects related to the use of the superposition of layers of material. Indeed, it has been noted that the formation of an optical device with a stacking of a multiplicity of layers induces a repetition of a pattern, formed by a variation of optical properties between the core of a layer and the interface between two layers. Such repetitive alternation of optical properties induces the formation of diffracting defects, hereafter stacking defects. These stacking defects are even further noticeable if the optical device is built with layers arranged sensibly parallel to the optical axis.

Accordingly, using the invention, within the parts corresponding to the core areas, the transition from one layer to the other is more homogeneous and those stacking defects are minimized or even avoided.

On the contrary, in this example, the skin 21 of each layer receives (in one time or in several times) a curing surface energy E whose intensity I1 is higher than or equal to the intensity corresponding to the Jacobs energy $E_J$ before a new layer is placed onto it.

More specifically, the intensity I1 of the curing surface energy E applied to the skin 21 (the first area A1) is higher or equal to a second predetermined energy threshold T2 that is equal to or greater than the Jacobs energy $E_J$.

This second predetermined energy threshold T2 is for example a recommended energy derived from the Jacobs' equation previously introduced. In this example the recommended energy is equal to the Jacobs energy $E_J$ directly derived from the Jacobs' equation plus an extra-energy in order to ensure a high conversion rate of the curable material, for example enough energy to harden into a solid state a virtual layer having a thickness increased by about 50% to about 200%, when applying the Jacobs' equation. This recommended energy may for example be the energy value recommended for printing directly a layer of said material by conventional practices in 3D printing in other domains than ophthalmic.

For example, this recommended energy $E_J$ is determined such that the conversion rate in the skin 20 is greater than 95% before a new layer of curable material is placed onto the considered layer.

In an alternative embodiment, the second threshold is the Jacobs energy $E_J$.

The advantage of building the skin area according to this method is that the core area(s) may be built according to the previously exposed method while enabling the shape of the manufactured device to be respected. The skin anchors the partially cured parts of the core areas with the previously formed layers. Accordingly, the sliced outline is respected despite the presence of external stress when displacing the formed layers and/or applying further layers of material.

We can now explain how is determined the geometry of the skin 21.

To this end, we will consider that the optical element is a simple block, without any internal cavity. But the invention also applies to optical elements having other shapes (for example to optical elements having holes for attaching a frame to the lens—in this example, the contour of the holes can be considered as belonging to the sliced outline C1, even if for at least one layer the contour of the holes may be actually disjointed from other parts of the sliced outline).

As explained above, a 2D sliced outline C1 is determined for each layer.

Figure 4:
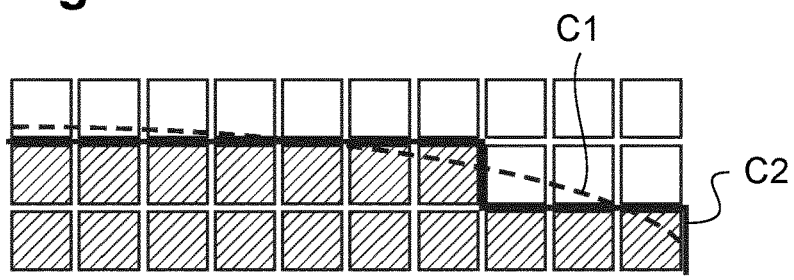
FIG. 4 represents a plane view of a sliced outline of the optical element and of the pixels generated by the manufacturing system on the curable material.

A shown in FIG. 4, because the projected pattern on the curable material 50 is pixelated, it cannot perfectly follow the sliced outline C1.

Consequently, a rule depending on the shape of the sliced outline C1 and of the pixels has to be determined in order to affect to each pixel a suitable curing surface energy E.

To understand this rule, we can define a "pixelated outline C2" as being the external outline of the pixels of the skin 21.

In a first simplified embodiment, we can consider that the pixels situated outside this pixelated outline C2 has to be switched OFF and that the pixels of the skin 21 have to be switched ON.

As shown in FIG. 4, a first rule could be to switch ON a pixel when the major part of this pixel is situated inside the sliced outline C1 and to switch OFF a pixel when a minor part of this pixel is situated inside the sliced outline C1 or when it is situated outside the sliced outline C1.

Here, both the sliced outline C1 and the pixelated outline C2 are defined in two dimensions (in a plane orthogonal to the axis $L_S$). In a variant, we may consider the sliced outline in three dimensions (named hereafter $C1_{3D}$) and apply another rule according to which the pixels switched ON are those associated to the voxels of which a major part of the volume is situated inside the sliced outline $C1_{3D}$.

As shown in FIG. 4, these two simple rules will create both lacunas and excess of material on the surface of the optical element 100.

That is the reason why another rule is preferred. This other rule consists in determining a first set of voxels to be polymerized more quickly (ie the voxels of the skin 21 of the considered layer) as a function of:
 the geometry of the sliced outline C1, and
 the type of post-processing process, said post-processing process being of the subtractive type or of the additive type, and the type of post-processing machine used, and/or
 the geometry of the voxels, and/or
 the type of the additive manufacturing machine used to manufacture the optical volume element 100.

The type of the additive manufacturing machine, and its features, may impose the geometry of the voxels and of the interpixel space, and possibly limits on the thicknesses of the layers and the irradiation strategy.

In a first embodiment, we can consider the situation in which the optical element 100 is designed to be post-processed thanks to a finishing process of the subtractive type.

In this situation, because the optical element 100 will be machined (surfaced, polished . . . ), creating an excess of material on the surface of the optical element 100 is preferred.

Figure 5A:
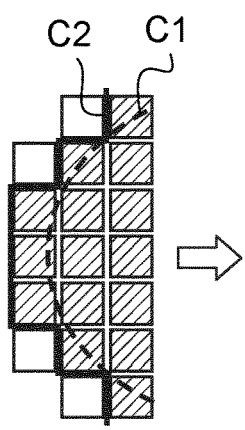
FIGS. 5A to 5C represent three steps of manufacturing an optical element when the post-processing process is of the subtractive type.

To this end, as shown in FIG. 5A, the pixelated outline C2 is determined in such a manner that it is situated outside (or on) the sliced outline C1 (the nearest to it). In other words, the rule consists in switching ON a pixel as long as the sliced outline C1 passes through it, or as long as the pixel is inside the sliced outline C1.

However, it is to be noted that the rule is still consistent with switching ON pixels that are outside of the sliced outline C1 as long as a further rule is followed, such as a the outline C2 involving a predetermined extra-thickness of material, possibly greater than one pixel or voxel size.

Figure 5B:
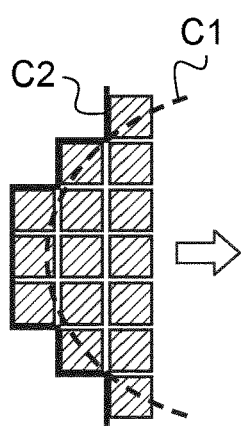
Figure 5C:
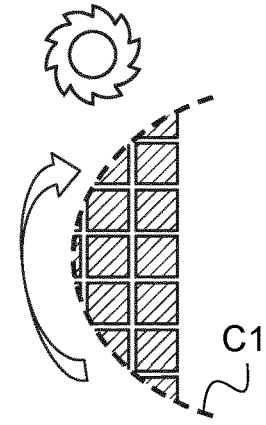

When all the curing steps are achieved (see FIG. 5B), the sliced outline C1 is situated inside the polymerized voxels. Hence, thanks to this method, when the optical element 100 is machined so as to reach a final 3D contour of the device, no lack of material appears within the surface of this element (see FIG. 5C).

In this first embodiment, the two dimensional sliced outline C1 has been considered. In a variant, the three dimensional outline $C1_{3D}$ can been considered.

The problem of considering only the two dimensional sliced outlines C1 is that lacunas may be revealed during the subtractive manufacturing step when no 2D sliced outline passes through a pixel but the associated outline $C1_{3D}$ passes through the corresponding voxel.

To prevent this, another solution consists in considering the 2D sliced outline C1 not in a mean plane of each voxel, but on both top and bottom faces of the voxel in order to check that the sliced outline C1 is positioned in the same way on these two faces.

Another solution consists in distinguishing an "upskin case" and a "downskin case".

Figure 9:
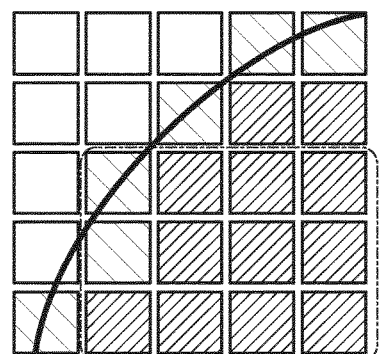
FIG. 9 is a view similar to that of FIG. 4, in an upper part of the optical element.

The "upskin case" corresponds to the situation of FIG. 9 where the voxels to be polymerized are situated under the sliced outline C1, with regard to a direction of stacking layers of material. In this case, the reference faces of the voxels may be the bottom faces (in other words, the sliced outline C1 to be considered in order to determine if a voxel has to be polymerized is the one that extends on the bottom faces of the voxels). By bottom face, it is meant the face of the layer (or voxel) farther from the energy source 2.

Figure 8:
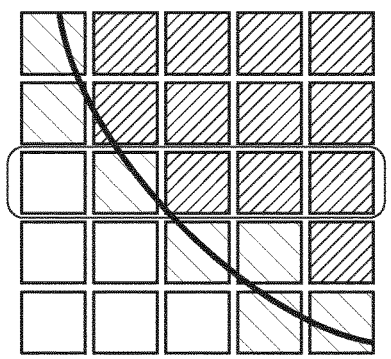
FIG. 8 is a view similar to that of FIG. 4, in a bottom part of the optical element.

The "downskin case" corresponds to the situation of FIG. 8 where the voxels to be polymerized are situated above the sliced outline, with regard to a direction of stacking layers of material. In this case, the reference faces of the voxels may be the top faces (in other words, the sliced outline C1 to be considered is the one that extends on the top faces of the voxels). By top face, it is meant the face of the layer (or voxel) closer from the energy source 2.

In a second embodiment, we can consider the situation in which the optical element 100 is designed to be post-processed thanks to a finishing process of the additive type. Such finishing process of the additive type may comprise a step of depositing a coating, either by inkjet printing, dip coating, spin coating, spray coating, press coating using a shaping membrane.

In this situation, because the optical element 100 will be coated, in order to respect the geometry of the device to manufacture, it is preferable to have lacunas rather than excess of material on the surface of the optical element 100.

Figure 6A:
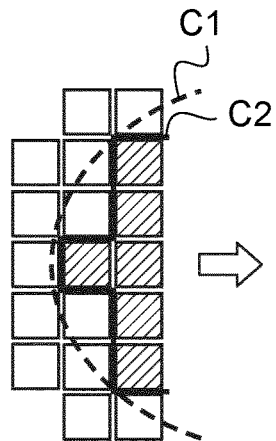
FIGS. 6A to 6C represent three steps of manufacturing an optical element when the post-processing process is of the additive type.

To this end, as shown in FIG. 6A, the pixelated outline C2 is positioned in such a manner that it is situated inside (or on) the sliced outline C1 (the nearest to it). In other words, the rule may then consist in switching OFF a pixel when the sliced outline C1 passes through it.

Figure 6B:
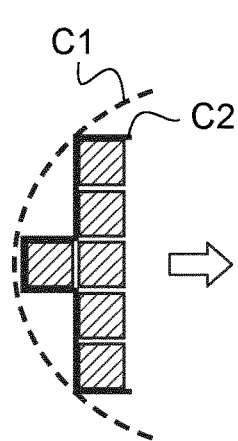
Figure 6C:
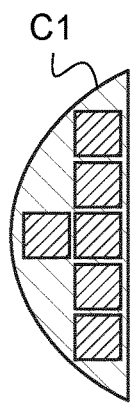
Figure 7A:
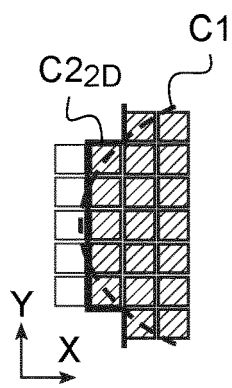
FIGS. 7A to 7D represent four solutions for positioning the sliced outline of the optical element relative to the pixels generated by the manufacturing system on the curable material.
Figure 7B:
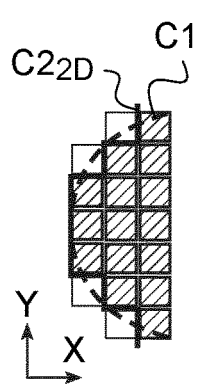
Figure 7C:
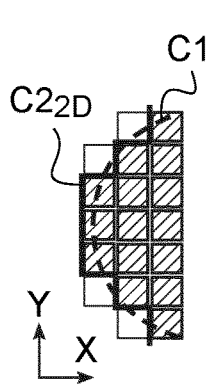
Figure 7D:
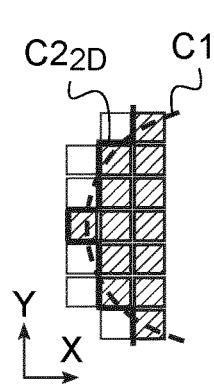

When all the curing steps are achieved (see FIG. 6B), the sliced outline C1 is situated inside the polymerized voxels. Hence, thanks to this method, no machining of the optical element 100 is needed before coating it (see FIG. 6C).

In this second embodiment, the two dimensional sliced outline C1 has been considered. In a variant, the three dimensional outline $C1_{3D}$ can been considered. In another variant, it is also possible to use the "upskin case" and "downskin case".

In this circumstance, the "upskin case" corresponds to the situation of FIG. 9 where the voxels to be polymerized are situated under the sliced outline, with regard to a direction of stacking layers of material. In this case, the reference faces of the voxels may be the top faces (in other words, the sliced outline C1 to be considered in order to determine if a voxel has to be polymerized is the one that extends on the top faces of the voxels). By top face, it is meant the face of the layer (or voxel) closer from the energy source 2.

The "downskin case" corresponds to the situation of FIG. 8 where the voxels to be polymerized are situated above the sliced outline, with regard to a direction of stacking layers of material. In this case, the reference faces of the voxels are the bottom faces (in other words, the sliced outline C1 to be considered is the one that extends on the bottom faces of the voxels). By bottom face, it is meant the face of the layer (or voxel) farther from the energy source 2.

The above mentioned rules enable the positioning of the external boundary of the skin 21. The remainder of the skin 21 is defined thanks to another rule consisting in considering a predetermined width for the skin 21. Preferably, this width (in the X direction or in a direction orthogonal to the sliced outline C1) is equal to or lower than 10 voxels. It is preferably equal to or lower than 5 voxels. It is preferably equal to or greater than 3 voxels.

More generally, the width of the skin needs to be enough to anchor the skin area of a layer to the skin area of a previously formed layer, and to provide enough mechanical resistance to maintain the shape of the formed layer.

In other words, this width is chosen to be thick enough to support the mechanical stresses applied during the manufacturing process, for example by use of a recoater, and thin enough to generate only negligible visual defects in the optical element 100.

It is to be noted that in the case of subtractive post processing, the sliced outline C1 may have a shape that would induce an extra thickness or positive offset with regard to the device to manufacture. It is further to be noted that in the case of additive post processing, the sliced outlined C1 may have a shape that would induce locally a negative offset with regard to the device to manufacture.

Said offset, positive or negative, their corresponding relative thickness and/or repartition and/or uniformity along the device depends on the type of post process and/or machine that would be applied. Accordingly, the sliced outline C1 includes any offset related to the post process.

As explained above, it is possible to adjust the position of the pattern projected onto the surface 55 of the curable material 50 in order to compensate the low surface energy received by the shadowed zones in a previous layer, by shifting the support 15 along an axis sensibly parallel to the surface of the curable material, or using an operationally simpler alternative, by adjusting the optical system 4. It is also possible to adjust this position of the pattern for each layer so as to reduce the errors induced by the pixelization of the outline.

As shown in FIGS. 7A to 7D, it is indeed possible to modify the position of the pixels relative to the sliced outline C1. This position has a great influence on the extent of the volume of lacunas or excesses of material generated at the optical element surface (the goal being to reduce this volume as much as possible).

This goal can be achieved by trying several positions of the sliced outline C1 relative to the pixels and by calculating, for each position, the volume error between the pixelated outline C2 and the sliced outline C1. Alternatively it can also be achieved using an error-minimizing algorithm, starting from a given position of the pixels and a given pixilated outline $C2_{i=0}$ relative to the sliced outline C1, and modifying the pixilated outline $C2_i$ and/or the position of the pixels by iterations or continuously in order to minimize the volume error while respecting the rules above related to the post processes. Thus, stochastic algorithm or linear optimization algorithm may be used.

In the represented embodiment, the several positions are situated at a distance from each other that is of maximal 1 pixel (along the X and Y axes that are orthogonal to the axis $L_S$).

In practice, the number of tried positions depends on the performance of the manufacturing system 1. For instance, if the shifting device 20 allows to do movement increments of 1 µm along the X and Y axes and if the pitch of each pixel is of 20 µm, the number of possibilities is of $20^2$ possibilities.

For each possibility, the position of the pixelated outline C2 is calculated according to one of the above-mentioned rules.

Thus, in order to calculate the error between the pixelated outline C2 and the sliced outline C1 for each possibility, various functions can be used.

Here, the used function consists in minimizing the root mean square surface error between the pixelated outline C2 and the sliced outline C1.

As explained above, the pixelated outline C2 and the sliced outline C1 are two dimensional contours situated in a same plane.

In a variant, it is possible to execute the same kind of calculation by considering the corresponding three dimensional outlines. In this variant, the used function consists in minimizing the root mean square volume error between the external outline C2$_{3D}$ of the voxels and the 3D sliced outline C1$_{3D}$.

The chosen position of the pixelated outline C2 relative to the sliced outline C1 is the one minimizing this function.

As explained above, the optical element 100 comprises at least a skin 21 and a core 22 situated inside the skin 21.

It can also comprise more than two different areas.

Figure 10:
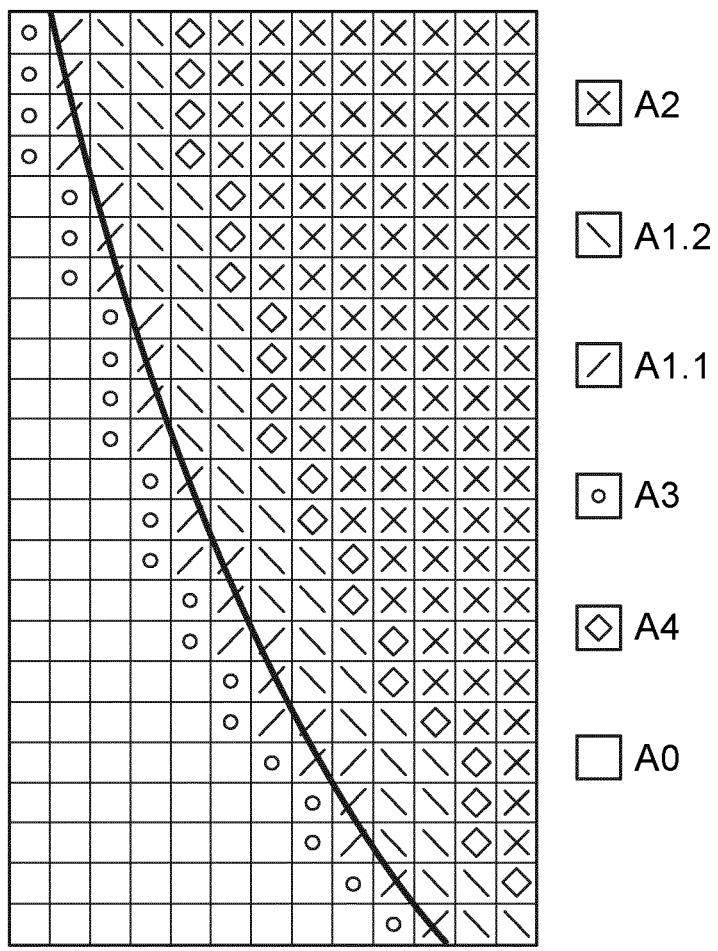
FIG. 10 is a view similar to that of FIG. 4 that shows different areas of the optical element.

As shown in FIG. 10, the optical element 100 may comprise a third area A3 situated outside the first area A1 (the skin 20) and adjacent to this first area A1.

Before giving details on this third area A3, we can note on FIG. 10 that the first area A1 is divided into two zones A1.1 and A1.2, the zone A1.1 being intended to be polymerized only if the post-process is of the subtractive type.

The third area A3 has a width thinner than or equal to that of the skin (for instance a width of 1 or 2 pixels) in this exemplary embodiment.

The curing surface energy E applied onto this third area A3 has an intensity I3 that is different from the intensity I1 of the curing surface energy E applied onto said first area A1, said intensity I3 being preferably smaller than the intensity I1.

The intensity I3 is preferably such that the curable material 50 in this third area A3 remains in an intermediate state after the additive manufacturing of the device. Hence, this area can play the role of a primer or adhesive for coatings (for instance for coatings necessary to filter the staircase effect of the optical element 100).

Thanks to its low mechanical strength, the voxel in intermediate state can also be used in order to smooth the surface by reducing the impact of using a discretized outline and make the shape of the lens smoother and closer to the intended design, before submitting the lens to a final curing step (which final step will be described after).

Considering a voxel in intermediate state on the outer part enables also to loosen the irradiations conditions of the voxels close to the surface since the issues encountered with the penetration depth of the light, and the resulting polymerization of unwanted zones are lifted, even becoming an opportunity. Indeed, instead of having to manage strictly the irradiations such that the voxels immediately outside the device to manufacture stay unpolymerized, it is possible to use an irradiation scheme for which partially polymerization of voxels outside the device to manufacture is possible. Thus, it is easier to generate a manufacturing file suitable to manufacture the optical element in the desired shape while respecting the above-mentioned constraints.

As shown in FIG. 10, the optical element may comprise a fourth area A4 situated between the first area A1 (the skin 20) and the second area A2 (the core 22).

The curing surface energy E applied onto this fourth area A4 has an intensity I4 that is different from the intensities I1, I2 of the curing surface energy E applied onto the first and second areas A1, A2, said intensity I4 being here smaller than the intensity I2.

The intensity I4 is preferably such that the curable material 50 in this fourth area A4 remains in a liquid or intermediate state (so as to be of lower mechanical strength than the core 22) during an irradiation of each layer of such voxel. It is to be noted that taking into account the irradiation of above layers, such fourth area ends in a solid state, but with a conversion rate smaller than the one in the first and second areas. For example, the fourth areas may stay in liquid or intermediate state longer than the second area.

The fourth area is here represented in-between the first and second area, but it may alternatively be enclosed within the second area. Such fourth area reflects that one may use different equilibrium between optical homogeneity and conversion pace in different part of the optical device depending on the case.

The optical element 100 may also comprise a fifth area A5 (not represented in the Figures) situated inside the first area A1. The intensity I5 of the curing surface energy E applied onto this area can be higher than or equal to the intensity I1. Such an area enables for instance the creation of patterns in the optical element (centering patterns, drawings . . . ).

As explained above, the curing step is repeated layer by layer to manufacture the entire optical element 100.

At each step, the intensity of the curing surface energy received by the curable material 50 may differ from a pixel to another.

To this end, a first embodiment consists in applying the curing surface energy E in one time, with a non-null intensity that differs from an area within the outline C2 to another area of said outline C2 (this embodiment is named "grayscale method") so as to reflect that the global intensity of the curing surface energy received by the curable material 50 may differ from a pixel to another within the irradiation of a given layer.

A second embodiment consists in applying the curing surface energy E on each layer in several substeps (this embodiment is named "multi-flash method").

During one of said substeps, the intensity of the curing surface energy E applied to the skin 21 is non-null and the intensity of the curing surface energy E applied to the core 22 is null, and during another of said substeps, the intensity of the curing surface energy E applied to the skin 21 is either null or non-null but equal to the intensity of the curing surface energy E applied to the core 22.

In other words, at least two different patterns are successively projected on the same surface 55 of the curable material 50, each pattern being composed of pixels either ON or OFF (there is no grayscale). One of these patterns represents only the skin 21 and the other represents the core 22 or both the core and the skin.

In a third embodiment, the first and second embodiment may be mixed: the curing energy of one layer is applied in several substeps and in at least one substep, at least one zone within the outline C2 receive a non-null energy different from a non-null energy received by another zone of said outline C2 and a third zone within said outline C2 may receive no energy during said substep.

When all the curing steps are achieved, the optical element can be handled and transported in order to be processed by another machine, thanks to the rigidity of the skin 21. Here, this other machine is able to operate a further final step of final post-curing of all the curable material 50 of the optical element 100, thanks to an UV light curing or a thermal curing. Alternatively, it may be post-processed as mentioned above before and/or after the final post-curing, and/or cleaned before the post-curing.

It is to be noted that the invention also applies when an optical device is obtained without needing a final post-curing and/or without needing a post process.

At this step of the description, we can give a more detailed embodiment of the invention.

We consider an illustrative (and not necessarily optimized) example in which the curable material is based on methacrylate monomers with experimentally determined values of critical Jacobs energy $E_C$ of 7 mJ and light depth penetration value Dp of 200 µm and an attenuation factor of 1/Dp, with a liquid state corresponding to a conversion rate below 30%, and a solid state occurring above a conversion rate of 70%. In the example, it is further chosen to have a layer thickness of 10 µm and a skin width of 3 voxels.

Using either the grayscale or the multi-flash mode, we directly apply on each layer a total dose of 2 mJ in the core 22 and of "α" mJ in the skin 21 of the optical element 100. This corresponds to reaching the Jacobs energy in a given layer the core area after irradiating the voxels of the given layer through 3 more layers.

Between two layers, the pattern is shifted of:
    0.5 pixel in the X direction the first time,
    0.5 pixel in the Y direction the second time,
    0.5 pixel in the X direction the third time,
    0.5 pixel in the Y direction the fourth time (then, the shifting process restarts from the beginning).

The risk in the upper part of the optical element 100 is to apply too much energy in regions of the core area situated immediately under the skin, since part of the UV light passes through the skin 21 and reaches the core 22. To reduce as much as possible this effect, the chosen value for a is, for this example of 7.56mJ for the pixels situated on the external surface of the optical element 100. This value corresponds to the Jacobs energy Ej for a layer of 10 µm for said material and is indeed the minimum value ensuring that the skin is in a solid state.

The risk in the lower part of the optical element 100 is to apply some energy in regions situated under the skin (outside the contour of the optical element), creating a shape error. In spite of this, since we want to solidify completely the skin 20, here again, the chosen value for α is of 7.56mJ for the pixel situated on the external surface of the optical element (and the width of the resulting excess material is equivalent to 12 or 13 voxels in our example). Alternatively, for the lower part, the pixilated outline C2 may be modified to take into account said resulting excess material after building all or most layers so that said resulting excess material ends on the sliced outline C1 or the tri-dimensional outline $C1_{3D}$. Further and or in alternative, the thickness of the skin, in term of number of layers, may be reduced in the lower part of the optical element 100.

The description deals with a DLP-SLA method but it is noted that the invention also applies with other methods, when the material is cured layer by layer, or pseudo layer by pseudo layer, or drop by drop.

The invention claimed is:
1. A process for the production of an optical element from a curable material by using an additive manufacturing technology, comprising a multiplicity of curing steps for curing said curable material inside outlines, a geometry of which is determined according to the geometry of said optical element, by applying a curing surface energy onto the curable material that is higher in a first area that extends along said outline than in a second area situated within the first area, the curing surface energy applied to the second area being strictly lower than a first predetermined energy threshold,
- wherein the curing surface energy is applied by a forming unit suitable to generate a pixelated pattern on a surface of the curable material that creates voxels in the curable material and wherein said first area has a width greater than 3 voxels and less than 10 voxels.

2. The process according to claim 1, wherein the curing surface energy-applied to the first area is higher or equal to a second predetermined energy threshold, said second predetermined energy threshold being equal to or greater than said first predetermined energy threshold.

3. The process according to claim 2, wherein:
- the curing surface energy applied to the second area is less than a critical Jacobs energy defined for the curable material, such that the curing surface energy applied to the second area cures the curable material in the second area to an intermediate state of matter that is in between a liquid state and a solid state.

4. The process according to claim 2, wherein:
- the curing surface energy applied to the first area is greater than or equal to a Jacobs energy (EJ) for the first area of a given layer, where:
- EJ=EC*exp (th/Dp),
- Ej is the Jacobs energy,
- th is a thickness of the layer,
- Dp is a light depth penetration value of the curing energy within the curable material, and
- Ec is a critical Jacobs energy;
- wherein the curing surface energy applied to the first area is sufficient energy to harden the curable material in the first area to a solid state.

5. The process according to claim 2, wherein:
- said first predetermined energy threshold is strictly lower than a critical Jacobs energy defined for the curable material;
- said second predetermined energy threshold is preferably equal to or greater than said critical Jacobs energy.

6. The process according to claim 1, wherein said curing step is repeated layer by layer with each outline to manufacture said optical element.

7. The process according to claim 1, comprising a further final step enabling a complete curing of both the curable material in the first area and the curable material in the second area, wherein a total curing surface energy received by a major part of the second area just before said final step is higher or equal to said first predetermined energy threshold.

8. The process according to claim 1, wherein the curing surface energy-is directly applied onto a third area situated outside the first area with an intensity that is different from an intensity of the curing surface energy applied onto said first area.

9. The process according to claim 1, wherein a curing surface energy is directly applied onto a fourth area, and/or a fifth area situated inside the first area with an intensity, respectively, that is smaller, respectively equal to or higher, than an intensity of the curing surface energy applied onto said first area and that is different from an intensity of the curing surface energy applied onto said second area.

10. The process according to claim 1, wherein:
- said curing step is repeated layer by layer to manufacture said optical element;
- for at least one layer, a curing energy is applied in one substep such that the curing energy is applied on a part of the surface of a curable material with a non-null intensity that differs from an area to another.

11. The process according to claim 1, wherein:
- said curing step is repeated layer by layer to manufacture said optical element;
- for at least one layer, a curing energy is applied in several substeps on the surface of the curable material;
- during one of said substeps, an intensity of the curing surface energy applied to the first area is non-null and an intensity of the curing surface energy applied to the second area is null; and
- during another of said substeps, the intensity of the curing surface energy applied to the first area is non-null and equal to the intensity of the curing surface energy applied to the second area.

12. The process according to claim 1, wherein the first set of voxels is determined as a function of the geometry of said outline and as a function of any one of the following parameters:
- a type of post-processing process, said post-processing process being of an subtractive type or of an additive type;
- a geometry of the voxels; and
- a reference of a machine used to manufacture the optical element.

13. The process according to claim 1, wherein a position of the first set of voxels relative to the surface of curable material is defined as a function of a geometry of said outline and as a function of the geometry of the voxels.

14. The process according to claim 13, wherein said curing step is repeated layer by layer to manufacture said optical element, each voxel having a thickness that is equal to a thickness of a considered layer, and wherein the position of the first set of voxels is defined so as to minimize a mean square of a volume error between said outline and an external outline of the first set of voxels.

15. The process according to claim 1, wherein, when said optical element is being designed to be post-processed thanks to a finishing process of a subtractive type, an external outline of said first area is situated outside and/or on said outline and when said optical element being designed to be post-processed thanks to a finishing process of an additive type, the external outline of said first area is situated inside and/or on said outline.

16. The process according to claim 1, wherein said optical element is an ophthalmic lens.

17. The process according to claim 1, wherein the curing surface energy is directly applied onto a third area situated outside the first area with an intensity that is different from an intensity of the curing surface energy applied onto said first area, said intensity being smaller than the intensity of the curing surface energy applied onto said first area.

18. The process according to claim 1, wherein the curing surface energy is applied by a forming unit suitable to generate a pixelated pattern on a surface of the curable material that creates voxels in the curable material and wherein said first area is formed of a first set of voxels that extends along a closed path that has a width of more than 3 voxels and less than 5 voxels.

* * * * *